US009317851B2

(12) United States Patent
Little, Jr. et al.

(10) Patent No.: US 9,317,851 B2
(45) Date of Patent: Apr. 19, 2016

(54) SECURE TRANSACTION PERSONAL COMPUTER

(75) Inventors: Douglas Ray Little, Jr., Charlotte, NC (US); William Treadwell, Addison, TX (US); Chadwick R. Renfro, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 692 days.

(21) Appl. No.: 12/433,454

(22) Filed: Apr. 30, 2009

(65) Prior Publication Data
US 2009/0319435 A1 Dec. 24, 2009

Related U.S. Application Data

(63) Continuation-in-part of application No. 12/142,177, filed on Jun. 19, 2008.

(51) Int. Cl.
*G06F 21/00* (2013.01)
*G06Q 20/40* (2012.01)
(Continued)

(52) U.S. Cl.
CPC ........ *G06Q 20/40145* (2013.01); *G06F 21/577* (2013.01); *G06Q 20/10* (2013.01); *G06Q 20/3821* (2013.01); *G06Q 20/40* (2013.01); *G06Q 40/02* (2013.01)

(58) Field of Classification Search
CPC .................................................. G06Q 20/363
USPC ......................................................... 705/64
See application file for complete search history.

(56) References Cited

U.S. PATENT DOCUMENTS 7,111,172 B1 * 9/2006 Duane et al. ................... 713/182
2003/0014636 A1 * 1/2003 Ahlbrand ...................... 713/176
(Continued)

FOREIGN PATENT DOCUMENTS

KR 20080050840 6/2008
WO WO 00/72508 A1 11/2000
(Continued)

OTHER PUBLICATIONS

U.K. Patent Office Search Report issued on Sep. 25, 2009, in re British Patent Application No. 0910441.5, filed Aug. 16, 2011.
(Continued)

*Primary Examiner* — Charles C Agwumezie
(74) *Attorney, Agent, or Firm* — Michael A. Springs; Moore & Van Allen PLLC; Jeffrey R. Gray

(57) ABSTRACT

A personal computer is provided comprising a network communication interface configured to communicate with the Internet. The computer further includes a memory device configured to store information and computer-executable program code. The computer further includes a processor operatively coupled to the network communication interface and the memory device. The processor and the computer-executable program code are both configured to provide enhanced security features for safeguarding financial transactions conducted over the Internet and for safeguarding non-public information stored in the memory from being retrieved over the Internet by an unauthorized entity. The computer further includes indicia attached to the computer. The indicia is visible to a potential user of the computer and is configured to portray to the potential user of the computer that the computer is specifically designed and built to provide increased security for financial transactions handled over the Internet.

15 Claims, 6 Drawing Sheets

(51) Int. Cl.
*G06F 21/57* (2013.01)
*G06Q 20/10* (2012.01)
*G06Q 20/38* (2012.01)
*G06Q 40/02* (2012.01)

(56) References Cited

U.S. PATENT DOCUMENTS

| | | | | |
|---|---|---|---|---|
| 2004/0111640 | A1* | 6/2004 | Baum | H04L 61/2015 726/13 |
| 2004/0139315 | A1* | 7/2004 | Tokutani | H04L 63/0435 713/156 |
| 2005/0065874 | A1* | 3/2005 | Lefner et al. | 705/38 |
| 2005/0138370 | A1 | 6/2005 | Goud et al. | |
| 2005/0226468 | A1* | 10/2005 | Deshpande | H04M 1/66 382/115 |
| 2006/0031927 | A1* | 2/2006 | Mizuno et al. | 726/11 |
| 2006/0268902 | A1* | 11/2006 | Bonner | H04L 63/102 370/401 |
| 2007/0030149 | A1* | 2/2007 | Hoerner | G08B 13/149 340/571 |
| 2007/0136579 | A1 | 6/2007 | Levy et al. | |
| 2007/0271610 | A1 | 11/2007 | Grobman | |
| 2008/0270787 | A1* | 10/2008 | LaCous | 713/156 |
| 2009/0158441 | A1* | 6/2009 | Mohler et al. | 726/27 |

FOREIGN PATENT DOCUMENTS

| | | |
|---|---|---|
| WO | WO 02/071686 A1 | 9/2002 |
| WO | WO 2005/027402 A1 | 3/2005 |
| WO | WO 2009/062111 A4 | 5/2009 |

OTHER PUBLICATIONS

UK Search Report for Application No. GB0910441.5 for search completed Sep. 25, 2009.
Description of "Secure Clean PC 2.11" taken from http://www.download32.com/secure-clean-pc-i26522.html released Oct. 3, 2005 (4 pages total).
Description of "SureClean 2.0.1002" taken from http://www.download32.com/sureclean-i27038.html released Feb. 17, 2006 (4 pages total).
Description of "Private Data Protector 1.0" taken from http://www.brothersoft.com/private-data-protector-50853.html last updated Oct. 27, 2006 (2 pages total).
GB Search Report mailed May 4, 2010 for GB Application No. GB0910443.1.

* cited by examiner

SECURE TRANSACTION PERSONAL COMPUTER

CROSS-REFERENCE TO RELATED APPLICATION

This application is a continuation-in-part of co-pending patent application Ser. No. 12/142,177, filed Jun. 19, 2008, the entire disclosure of which is incorporated herein by reference.

FIELD

Embodiments of the present invention relate to personal computers.

BACKGROUND OF THE INVENTION

Currently, computer makers have begun to target specific user-bases by creating computer systems designed from the ground-up for specific purposes such as gaming. A computer designed with gaming in mind may be designed with special cooling systems, fast hard drives, plenty of memory, and extremely high-end video cards. The operating systems may also be specially designed for media intensive applications to run smoothly. As another example, blade terminal computers are designed to have limited to no local storage, but heavy network and memory capability to run remote applications seamlessly.

However, currently there is a problem where consumers feel uncomfortable interacting with online banking, online e-commerce systems, or other transaction systems where personalized financial information may be transferred. The current solution is to require a user to buy off-the-shelf (OTS) software from vendors to help provide some security for these types of transactions. However, these applications are susceptible to being circumvented by malicious software, leaving a user's system at high risk of exposure to identity theft and becoming victims of fraud.

BRIEF SUMMARY OF THE INVENTION

According to one aspect of the present invention, a computer, such as a personal computer, is provided having: a network communication interface configured to communicate with the Internet, a memory device configured to store information and computer-executable program code, and a processor operatively coupled to the network communication interface and the memory device. The processor and the computer-executable program code are both configured to provide enhanced security features for safeguarding financial transactions conducted over the Internet and for safeguarding non-public information stored in the memory from being retrieved over the Internet by an unauthorized entity. The computer also includes indicia, such as a name or a logo of a financial institution, attached to the computer such that the indicia is visible to a potential user of the computer, wherein the indicia is configured to portray to the potential user of the computer that the computer is specifically designed and built to provide increased security for financial transactions handled over the Internet.

In one embodiment, the computer also includes: a motherboard with built-in security technology; an operating system with built-in security features; an identity security module; a loss protection module; an Internet security module; and a support module.

In one embodiment, the computer includes a biometric device configured to scan a characteristic of a user's body. In such an embodiment, the memory device includes one or more files comprising biometric data for an authorized user, and the processor is configured to compare the scan of the characteristic of the user's body with the biometric data in the one or more files and grant authorization to the user based on the comparison.

In one embodiment, the computer includes computer-executable program code stored in the memory and configured to instruct the processor to: search data stored on the computer; identify non-public information stored on the computer; inform the user about the non-public information stored on the computer; and ask the user if the non-public information should be deleted from the computer. In one such embodiment, the memory device includes one or more non-public information identifying rules are stored therein, and the computer-executable program code stored in the memory device is configured to identify non-public information stored on the computer by comparing the data stored on the computer to the one or more non-public information identifying rules. In another such embodiment, the non-public information includes a credit or debit card number, a credit or debit account number, a social security number, a password, a user identification code, or a driver's license number.

In one embodiment, the computer includes: a tracking tool configured to identify the location of the computer if the computer is stolen; a credit bureau protection tool configured to monitor the user's credit report; drive encryption technology for encrypting at least a portion of data stored in the memory and requiring a password to access the encrypted data; and a one-time password tool for requiring that a new password be used each time the computer is logged in to.

In one embodiment, the computer includes computer-executable program code stored in the memory device and configured to instruct the processor to: determine the computer's location on a network when the computer is used to access the network; determine whether the computer's location is a known location; and send an electronic communication to a location defined in the memory if it is determined that the computer's location is not a known location, the electronic communication comprising a notification of the computer's use to access the network. In one such embodiment, the computer-executable program code is configured to instruct the processor to determine the computer's location on the network each time the computer accesses the network. In another such embodiment, the computer-executable program code is configured to instruct the processor to compare the computer's location on the network to a list of past locations for the computer and determine that the location is known if the computer's location matches a past location. For example, in one embodiment if the user responds to the electronic communication that the computer's use is authorized or if the user does not respond to the electronic communication within a predetermined amount of time, then the computer's location is stored in the memory as a past location. In one embodiment, the electronic communication includes an email, text message, or phone call to an authorized user of the computer.

In one embodiment, the computer includes computer-executable program code stored in the memory device and configured to instruct the processor to notify a user if a website that the user is surfing does not use HTTPS. In one embodiment, the computer includes computer-executable program code stored in the memory device and configured to instruct the processor to contact an Internet search engine to determine if a website is poses a security risk. In one embodiment of the computer, the processor includes virtualization technology, such an Intel® vPro™ technology.

In one embodiment, the computer includes at least one virtualized software module configurable to operate outside of an operating system. For example, in one embodiment the computer includes a web browser, where the web browser is configurable to operate in a virtualized state outside of the operating system. For example in one embodiment the web browser is configurable to operate in a virtualized state outside of the operating system when accessing a secure site, when accessing an e-commerce site, when accessing a secure transactions site, or upon selection by user. In one embodiment, the computer includes a monitoring application, the monitoring application detecting suspicious behavior during execution of programs on the computer, the monitoring application being configured to operate in a virtualized state outside of the operating system.

In one embodiment of the computer, the processor is configured to make duplicates of essential system files. In one such embodiment, the essential system files and the duplicates of the essential system files are monitored such that when any of the essential system files or the duplicates of the essential system files are modified, the modified files are restored back to their original state.

BRIEF DESCRIPTION OF THE DRAWINGS

Having just described embodiments of the invention in general terms, reference will now be made to the accompanying drawings in which embodiments of the invention are further described by way of non-limiting examples of embodiments of the invention in which like reference numerals represent similar parts throughout the several views of the drawings and wherein.

DETAILED DESCRIPTION OF THE INVENTION

Figure 1:
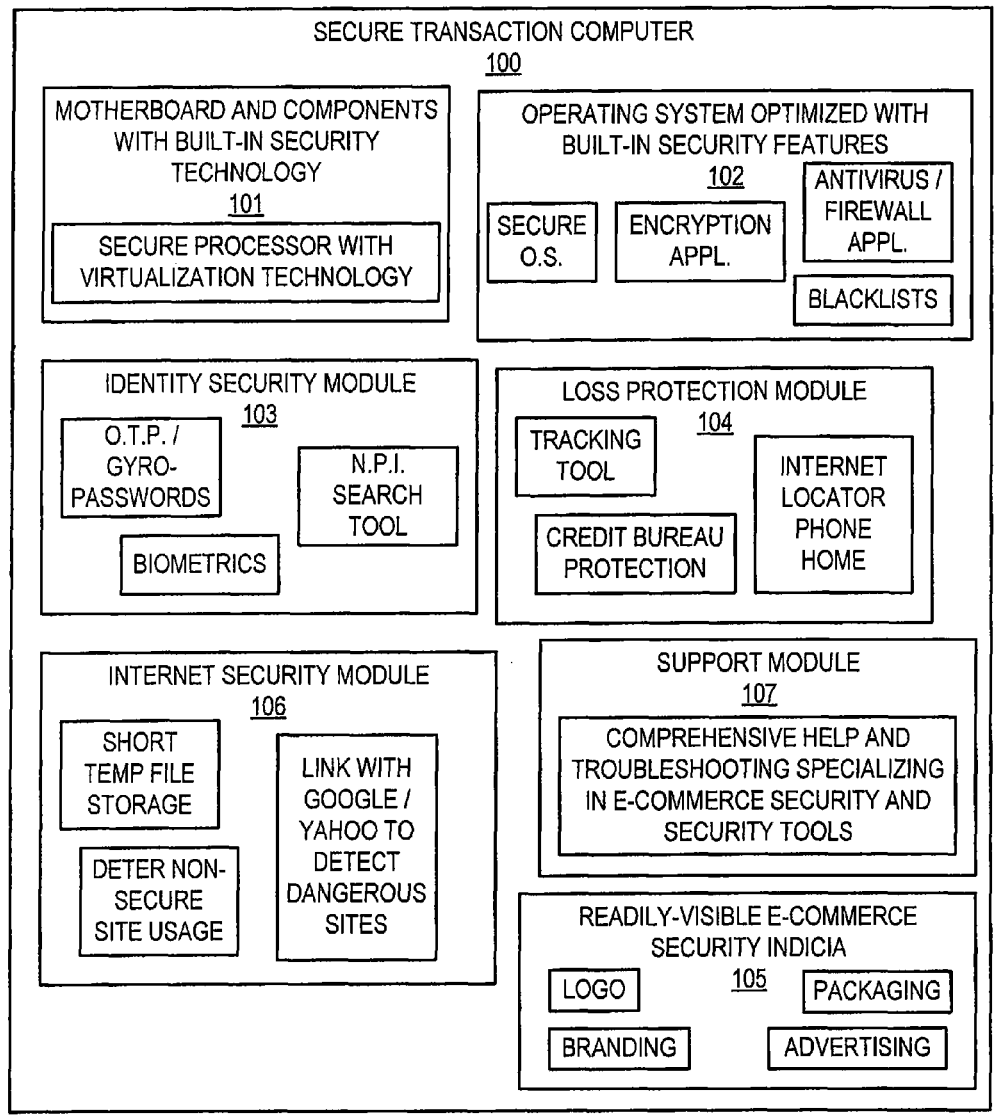
FIG. 1 is a diagram of a secure transaction computer according to an example embodiment of the present invention.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.) or an embodiment combining software and hardware aspects that may generally be referred to herein as a "system." Furthermore, embodiments of the present invention may take the form of a computer program product on a computer-usable storage medium having computer-usable program code embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

In the context of this document, a computer-usable or computer-readable medium may be any medium that can contain, store, communicate, or transport the program for use by or in connection with the instruction execution system, platform, apparatus, or device. The computer-usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, a secure computer is built with secure hardware, a secure operating system, identity security, loss protection security, network/Internet security, security support, and other applications, devices, and features that make the computer specifically suited for engaging in online and other electronic financial transactions. In fact, in one embodiment, the secure computer is branded to denote that the computer has been designed with an abundance of e-commerce security features. For example, the secure computer and/or the secure computer's packaging, may include a name, logo, or other indicia of a company, such as a financial institution, that is known for maintaining a high standard of financial security and/or for its financial security sophistication. An individual that needs a computer primarily for surfing the Internet and engaging in online banking and/or shopping may find such a specialized personal computer appealing since the computer has been designed from the ground up with such use in mind.

Embodiments of the present invention build upon a secure hardware architecture that provides mechanisms for virtualization and separation of operating system (OS) level functions and applications from other applications and/or potential reporting systems. The secure hardware architecture enables secure status reporting as well as potential secure communication with other hardware functions such as a network interface card (NIC). A software system that runs on the secure hardware architecture may be virtualized to actually perform secure communication with online banking systems and secure transaction systems. The Intel® vPro™ processor is one example of a secure hardware architecture that may be used in embodiments of the present invention. However, embodiments of to the present invention are not limited to use of this processor or hardware architecture.

More particularly, embodiments of the present invention may include a processor with a secure hardware architecture that has the ability to run software code in a virtualized state outside of the running operating system ("OS"). For example, an instance of a web browser may be "flipped" into a virtualized state and operated outside of the OS, thus preventing eavesdropping by malware. In addition, according to embodiments of the present invention, the computer system may be security hardened by duplicating essential system files, thus preventing overwriting by malicious software. Also, global policies may be put in place that may restrict what users may do, and may provide requirements to users for passwords or other mechanisms before allowing system modifications. The computer system may also include monitoring software that monitors the execution of programs and looks for suspicious behavior. The monitoring software may alert the processor if suspicious behavior has been detected. The computer system, according to embodiments of the present invention, may also include software that tracks security events (similar to an auditing system) that may covertly send notifications regarding detected security events back to a central location that stores and tracks security events (e.g. a corporate database). The monitoring software and the tracking software may run in a virtualized environment outside of the OS, and "watch" in parallel as the OS runs. This provides a segment so that, in one embodiment, the OS cannot see the software in the virtualized state and therefore, malicious software cannot modify it.

The OS may be configured such that if either the original essential system files or the duplicates of the essential system files are modified, they are reverted back to either their original state or a known good state (which will generally be the state of the non-modified original or duplicate file). Since both the original and duplicate essential system files cannot be modified at the same time, they may be used to correct each other if one of them is modified. Further, according to embodiments of the present invention, global policies may be set or modified by a user with administrator rights (or domain rights at a corporate level). The processor may issue security related alerts to a user identifying any ramifications of making certain modifications to the system. In addition, according to embodiments of the present invention, the policies may be set, modified, or completely disabled as desired by an appropriate user with the appropriate rights (e.g., administrator rights). Moreover, according to embodiments of the present invention, virtualized software may be used to create secure on-time session keys or private keys for a public key infrastructure (PKI) and be used as a secure "store," thus preventing malicious software from being able to use/sniff the keys. This provides for a more secure network communication.

Further, embodiments of the present invention may have a predetermined and hardened operating system installed on the secure computer (e.g., a hardened version of Windows XP™ or Windows Vista™). In embodiments of the present invention, all security measures may be turned on or heightened to close any potential security holes (e.g., auto-update of the operating system is defaulted to "on," reputable antivirus software is installed with auto-update and auto-scan defaulted to "on," firewall feature of the operating system is defaulted to "on," restrictions of the web browser are set and defaulted to high security settings, etc.). This ensures that the secure computer security is tight, defeating many of the common problems with most systems today.

In addition to the hardware and operating system being security enhanced and "tightened," additional security may be provided to protect the user's identity. For example, biometrics may be built-into the computer which allows users to use "what they are" to gain access to the use of the computer, replacing the typical password and keystroke based mechanisms that usually fall prey to eavesdropping by malware. Other examples of identity security used in some embodiments include one-time password (OTP) technology, and gyro-passwords. Embodiments of the present invention also include a non-public information search tool that searches for information stored in the computer that the user may desire to keep private and confidential, such as credit card numbers, social security numbers, date of birth, identification numbers, tax information, passwords, and/or the like. Once this tool finds the information, the tool may prompt the user to determine whether to delete the information from the computer's memory so that spyware and other malicious programs cannot steal the information from the computer. The use of identity security tools, such as biometrics devices and the non-public information search tool, adds a level of security that makes it difficult for malware, spyware, or other software to steal passwords, and provides a more secure environment in which to surf the Internet and conduct financial transactions.

Moreover, according to embodiments of the present invention, a computer for secure transactions may be marked with a special logo to brand the system as a type of secure computer. This provides notice to a user that this computer is built with enhanced security for secure e-commerce, online banking and other secure type transactions. As described in greater detail below, embodiments of the present invention may also include loss protection security, for example, LifeLock™ technology or LoJack™-type technology, as well as special hardware measures such as hard drive locking and encryption. Hard drive locking technology insures that if the hard drive is stolen, it cannot run in a new system. This protects the data contained in the hard drive from others. Therefore, a secure computer according to embodiments of the present invention mitigates many of the risk factors such as key logging and typical malware by providing restricted access (e.g., using biometrics and other security measures), a secure hardware architecture, and a hardened and secure operating system. These embodiments and other embodiments are described in greater detail below in relation to the figures.

FIG. 1 shows a diagram of a secure transaction computer 100 according to an example embodiment of the present invention. The secure transaction computer 100 may take the form of a desktop computer or a mobile computer, such as a laptop or handheld computer. As illustrated in FIG. 1, the secure transaction computer 100 may include such enhanced security features as: (i) a motherboard 101 with components such as, for example, a processor with built-in security technology; (ii) an operating system 102 optimized with built-in security features; (iii) an identity security module 103; (iv) a loss protection module 104; (v) an Internet security module 106; (vi) a support module 107; and (vii) readily-visible e-commerce security indicia 105.

Figure 3:
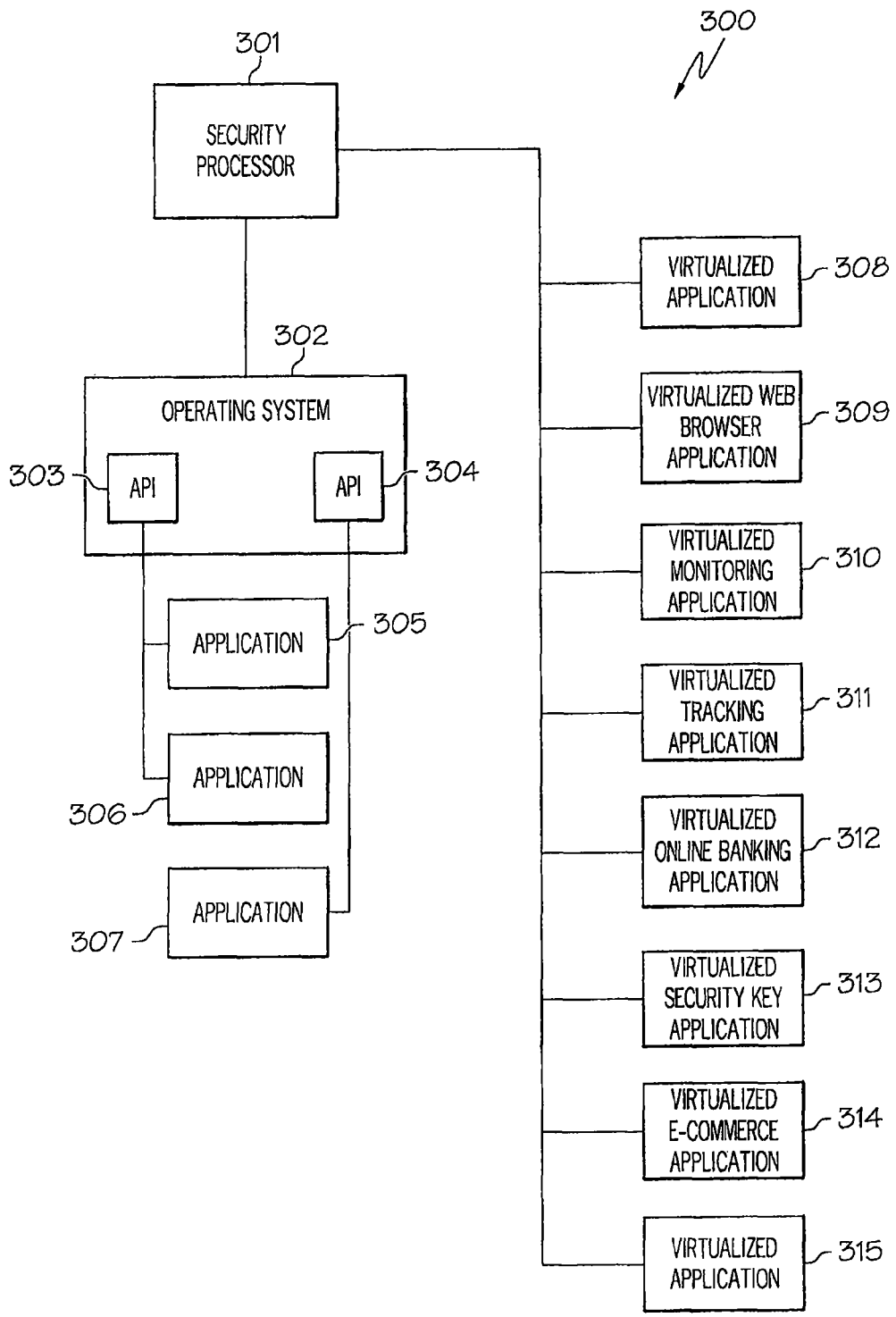
FIG. 3 is a system for running virtualized applications according to an example embodiment of the present invention.
Figure 4:
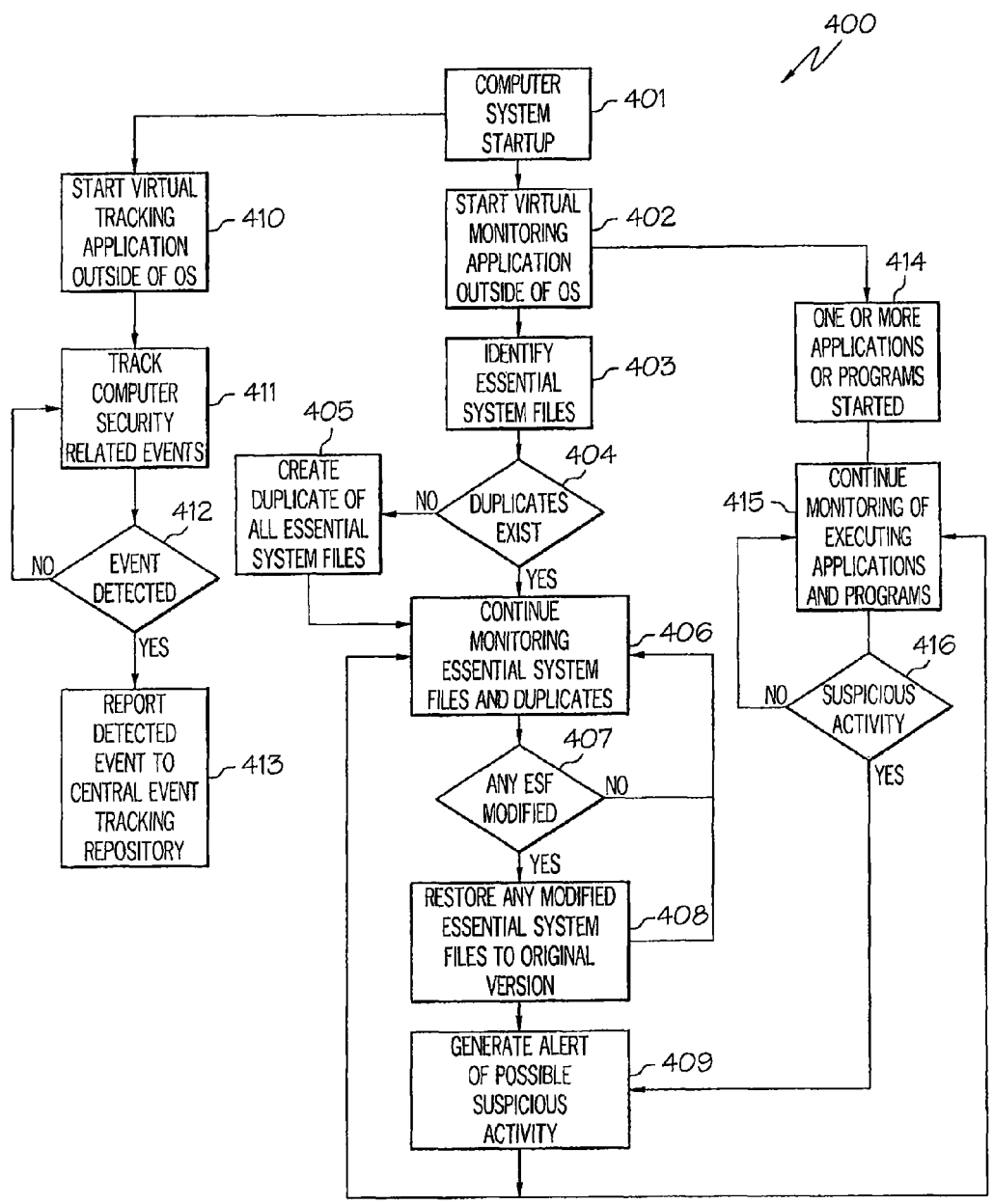
FIG. 4 is a flowchart of a process for secure online transactions according to an example embodiment of the present invention.

In one embodiment, the motherboard 101 includes a processor having built-in security features such as, for example, the Intel® vPro™ architecture. Further, as described above, the processor on the motherboard 101 may be configured to run applications outside of the operating system 102 such as in a virtualized space on the computer 100 or on a remote computing device. FIGS. 3 and 4 illustrate the virtualization security feature of some embodiments of the invention in greater detail.

FIG. 3 shows a system for running virtualized applications according to an example embodiment of the present invention. The system 300 may include a security processor 301 that runs an operating system 302. The operating system 302 may include one or more application programming interfaces (APIs) 303, 304, that interface with one or more applications 305, 306, and 307. Further, the system 300 may include one or more virtualized applications 308-315 that may be run or executed by the security processor 301 outside of the operating system 302. The virtualized applications may be virtualized instances of the one or more applications 305, 306, and 307 or may be other virtualized applications. The virtualized applications may include a virtualized web browser application 309, a virtualized monitoring application 310, a virtualized tracking application 311, a virtualized online banking application 312, a virtualized security key application 313, a virtualized secure transaction application 314, and/or the like. By operating outside of the operating system 302, the operating system 302 and other applications are protected against malicious software that may attack one of the virtualized applications 309-314.

FIG. 4 shows a flowchart of a process for secure online transactions according to an example embodiment of the present invention. In the process 400, a computer system may be started up (e.g., powered up and booted), as represented by block 401. As represented by block 402, a virtual monitoring application may be started and executed where the virtual monitoring application runs outside of the operating system. As represented by block 403, all essential system files may be identified. As represented by block 404, it may be determined if duplicates of the essential system files exist and, if it is determined that duplicates do not exist, duplicates of all essential system files may be created, as represented by block 405. If duplicates do exist or after all duplicates of essential system files have been created, in block 406 the essential system files and duplicates of these files may be continued to be monitored by the virtual monitoring application. As represented by block 407, it may be determined if any of the essential system files or the duplicate files have been modified and if not, the monitoring may continue. If any of the essential system files or duplicate essential system files have been modified, in block 408, any modified essential system file or duplicate essential system file may be restored to its original version or to a known good state, which, in one embodiment, involves restoring the file to the state of the non-modified original or duplicate file or, in another embodiment, prompting the user to insert a disk containing copies of the original essential files. Then, as represented by block 409, an alert of possible suspicious activity may be generated and the process return back to block 406, where monitoring of the essential system files and duplicates continues.

Further, after the computer system's startup in block 401, in block 410 a virtual tracking application may also be started and run outside of the operating system. Then, as represented by block 411, computer security related events may be tracked by the tracking application. As represented by block 412, it may be determined if a security related event has been detected and if not, then the process may return to block 411 where computer security related events may be continued to be tracked. If a security related event has been detected, then, as represented by block 413, the detected event may be reported to a central event tracking repository or other entity.

After the virtual monitoring application has been started in block 402, one or more applications or programs may be started, executed or run, as represented by block 414. As represented by block 415, the virtual monitoring application (or a different virtual monitoring application) may continue monitoring of the executing applications and programs. As represented by block 416, it may be determined if any suspicious activity has been detected based on monitoring the execution of any of the applications and programs and if not, the monitoring may continue. If suspicious activity has been detected, then, as represented by block 409, an alert of possible suspicious activity may be generated. The alert may be generated on a display of the computer system or generated and sent to a remote person or device.

Referring again to FIG. 1, in addition to the secure hardware described above, some embodiments of the present invention further include an the operating system 102 optimized with built-in security features, such as encryption technology, anti-virus technology, firewall technology, and threat intelligence blacklists. For example, in one embodiment, the secure transaction computer 100 is loaded with the Windows Vista™ operating system and the default settings include turning the auto-update on, anti-virus auto-update on, firewall technology on, web browser restrictions on, etc. In one embodiment, the secure transaction computer 100 includes encryption technology that encrypts information stored in a particular drive, disk, or other volume. In one embodiment, access is permitted to the encrypted information automatically if there are no corrupted or suspicious files, for example, upon startup. In other embodiments, however, the secure transaction computer 100 is configured to boot the computer without the operating system starting up and then requires that the user enter a password or other code to allow loading of the operating system and access to the encrypted drives, disks, or other volumes. For example, in one embodiment, the secure transaction computer 100 includes BitLocker™ encryption on the entire hard drive.

The identity security module 103 of the secure transaction computer 100 includes devices, applications, and/or other features that help ensure that only authorized individuals have access to the computer and help secure identification information, such as passwords, identification codes, personal security information, and/or the like, from being stolen. As illustrated in FIG. 1, in some embodiments, the secure transaction computer 100 includes such security features as a one-time password (OTP), gyro-password, and/or the like. For example, in one embodiment, at least a portion of the user's password changes each time the user logs into the computer and/or performs a financial transaction on the computer. This may be accomplished by, for example, rotating through a plurality of passwords known to the user, performing an algorithm known to the user on the previous password, asking questions of the user that only the user would know the answer to, or requiring that the user enter a time-sensitive number or other code from, for example, a key fob that changes numbers randomly after a predefined amount of time and is synchronized with the computer's authorization application. In another embodiment, new passwords are sent to another device of the user's, such as a cell phone, PDA, email account, etc.

As further illustrated in FIG. 1, in some embodiments of the identity security module 103, biometrics may be used to authorize a user to access the secure transaction computer 100. For example, in one embodiment, the secure transaction computer 100 includes a device configured to scan, image, or otherwise read characteristics of a user's fingerprint, handprint, iris, face, ear, and/or other body part and compare the reading to a reading stored in the computer's memory. If the biometric reading matches a record of an authorized user stored in the memory of the secure transaction computer 100, the secure transaction computer 100 allows the user to access the secure transaction computer 100 or perform a certain task, as the case may be. If the biometric reading does not match an authorized biometric record, the secure transaction computer 100 may refuse access and send an alert to a predetermined person, device, or network or otherwise take action to prevent unauthorized access and notify the appropriate personnel.

Figure 5:
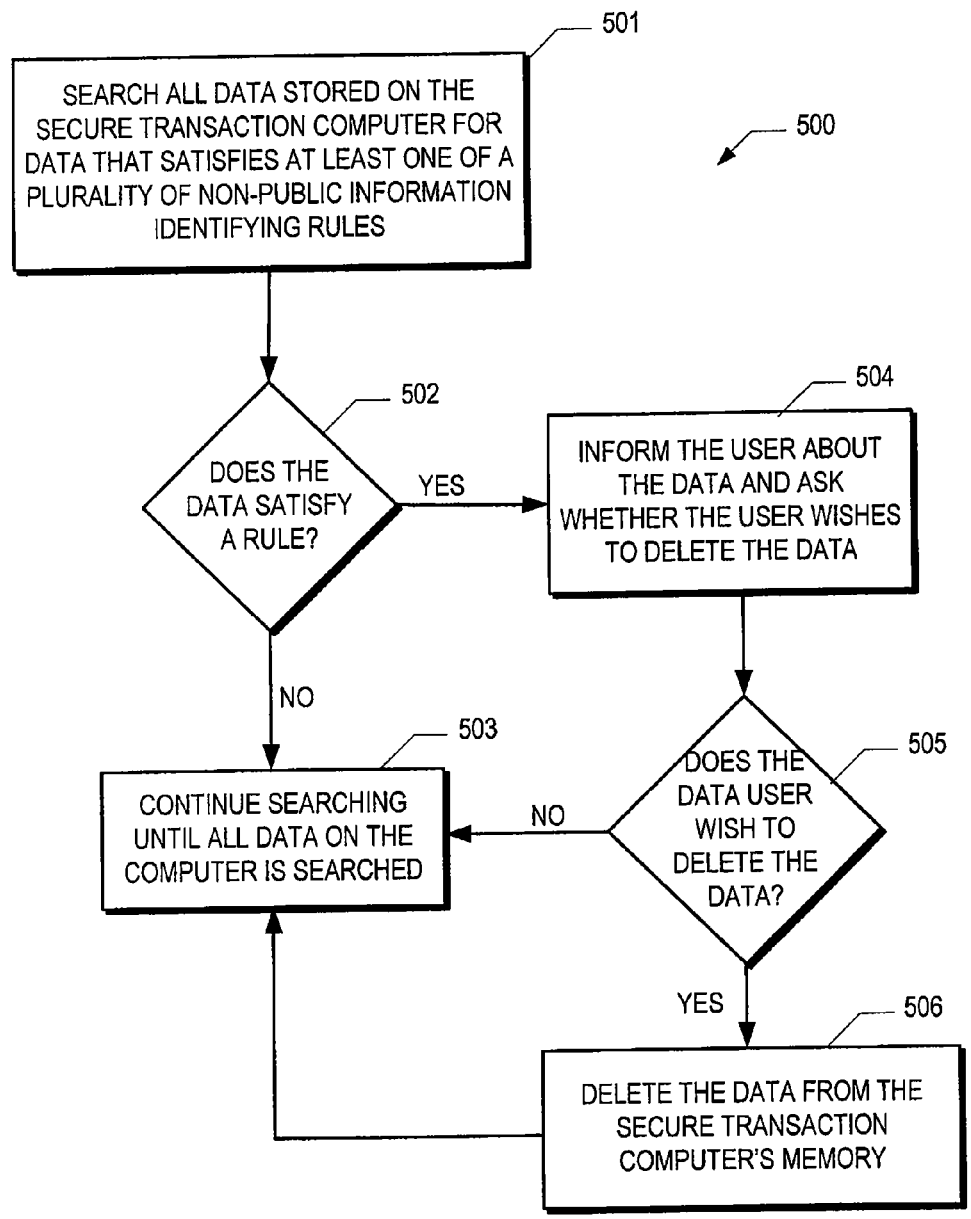
FIG. 5 is a flowchart of a process for identifying and deleting non-public information stored on the secure transaction computer according to an example embodiment of the present invention.

As further illustrated in FIG. 1, some embodiments of the identity security module 103 further include a Non-Public Information (NPI) search tool configured to search through the files, folders, disks, drives, and other data repositories stored in the memory of the secure transaction computer 100 and identify data that the user may consider confidential and may not want stored on the secure transaction computer 100 where there is a risk that the data could be stolen and used for an unlawful or undesirable purpose. FIG. 5 provides a flowchart illustrating a process 500 for identifying and deleting non-public information stored on the secure transaction computer, which may be implemented by the secure transaction computer's processor executing computer-executable program code stored thereon, according to an example embodiment of the present invention. In one embodiment, the NPI search tool runs periodically based on a user-defined or other predefined schedule. Alternatively or additionally, the NPI search tool may be configured to run whenever the user requests it to run.

As illustrated by block 501 in FIG. 5, the NPI search tool is configured to search all data (or some user-defined or other predefined group of data or data locations), including temporary and hidden files, for data that satisfies at least one of a plurality of non-public information identifying rules. The NPI identifying rules are rules that help the computer to identify information that is possibly of the type that the user wishes to keep private and confidential or might present a security risk if obtained by the wrong hands. These rules are generally stored in the secure transaction computer's memory. For example, one such rule may be configured to identify any sixteen digit number stored in the memory of the secure transaction computer 100 since it is possible, if not likely, that the sixteen digit number will be a user's credit card number.

As represented by block 502, if the data satisfies a NPI identification rule, the NPI search tool informs the user about the data and asks the user whether the data should be deleted from the secure transaction computer's memory, as represented by block 504. For example, in one embodiment, the secure transaction computer 100 displays the data that satisfies a NPI identification rule on the secure transaction computer's screen along with information about the context in which the data was found and the data's location(s). The secure transaction computer 100 will also use the screen or other user output device to ask the user whether to keep the identified data in the secure transaction computer's memory or to delete it from memory. The user can then respond using a user input device of the secure transaction computer 100.

As represented by block 505, if the user decides to delete the data, the secure transaction computer 100 delete's the data from its memory, as represented by block 506. In some embodiments, not shown, rather than require a response from the user, some data or types of data are automatically deleted by the secure transaction computer 100 according to user-defined or other predefined rules. In any event, as represented by block 500, the NPI search tool continues searching until all data on the computer (or all data in a defined group or location) is searched. It will be appreciated that the NPI search tool can be useful in maintaining security by having rules that will identify such user data as credit/debit card numbers, date of birth, address, license identification number, login IDs, passwords, telephone numbers, bank account numbers, other account information, other identification information, and/or other information that a user may wish to keep private. Such information is sometimes, unbeknownst to the user, stored in temp files or other locations of a computer after a financial transaction where the information can sit for some length of time and risk detection by one or more malicious programs. In one embodiment, the user can select and deselect certain rules for the NPI search tool to use and, in some embodiments, the user can create his or her own rules that are specifically tailored to locate non-standard non-public information. The rules, however, should generally not be so specific that they themselves can be used to provide information about the user's non-public information.

Referring again to FIG. 1, the secure transaction computer 100 also generally includes a loss protection module 104 that is configured to mitigate losses after a security breach occurs. For example, in the illustrated embodiment, the loss mitigation module 104 includes a tracking tool, a credit bureau protection tool, and an "internet locator home phone tool." The tracking tool is generally a tool configured to help the user to locate the secure transaction computer 100 in the event that the computer is stolen or misplaced. For example, in one embodiment the secure transaction computer 100 includes a tracking device that can be turned on in the event that the computer is reported stolen or in the event of a security breach such as the occurrence of a certain number of repeated unauthorized login attempts. The tracking device may be, for example, a GPS tracking device or a device configured to communicate with a central tracking system over the Internet whenever the secure transaction computer 100 has access to the Internetn or other network after a particular type of security breach. In other embodiments, the secure transaction computer 100 includes software of, hardware of, and/or a subscription to a third-party commercial computer-tracking company such as LoJack™ and CompuTrace™.

The credit bureau protection tool is configured to assist the user in identifying and fixing errors and unauthorized entries from showing up in the user's credit report and negatively impacting the user's credit score. In one embodiment, the credit bureau protection tool includes software of, hardware of, and/or a subscription to a third party commercial credit report protection tool such as LifeLock™.

The "internet locator home phone tool" is configured to create and send an alert to a predetermined email address, phone number, or device or location, if the secure transaction computer 100 is used from any location on the Internet (e.g., an IP address) that is not a normal location for the secure transaction computer 100. In this way, a user can know if the computer 100 has been stolen and is being used and the user or a third party may be able to track where the stolen computer is located or moving. For example, FIG. 6 is flowchart of a process 600 for identifying unauthorized use of the secure transaction computer 100 and tracking the secure transaction computer 100, as may be implemented by the internet locator home phone tool according to an example embodiment of the present invention.

Figure 6:
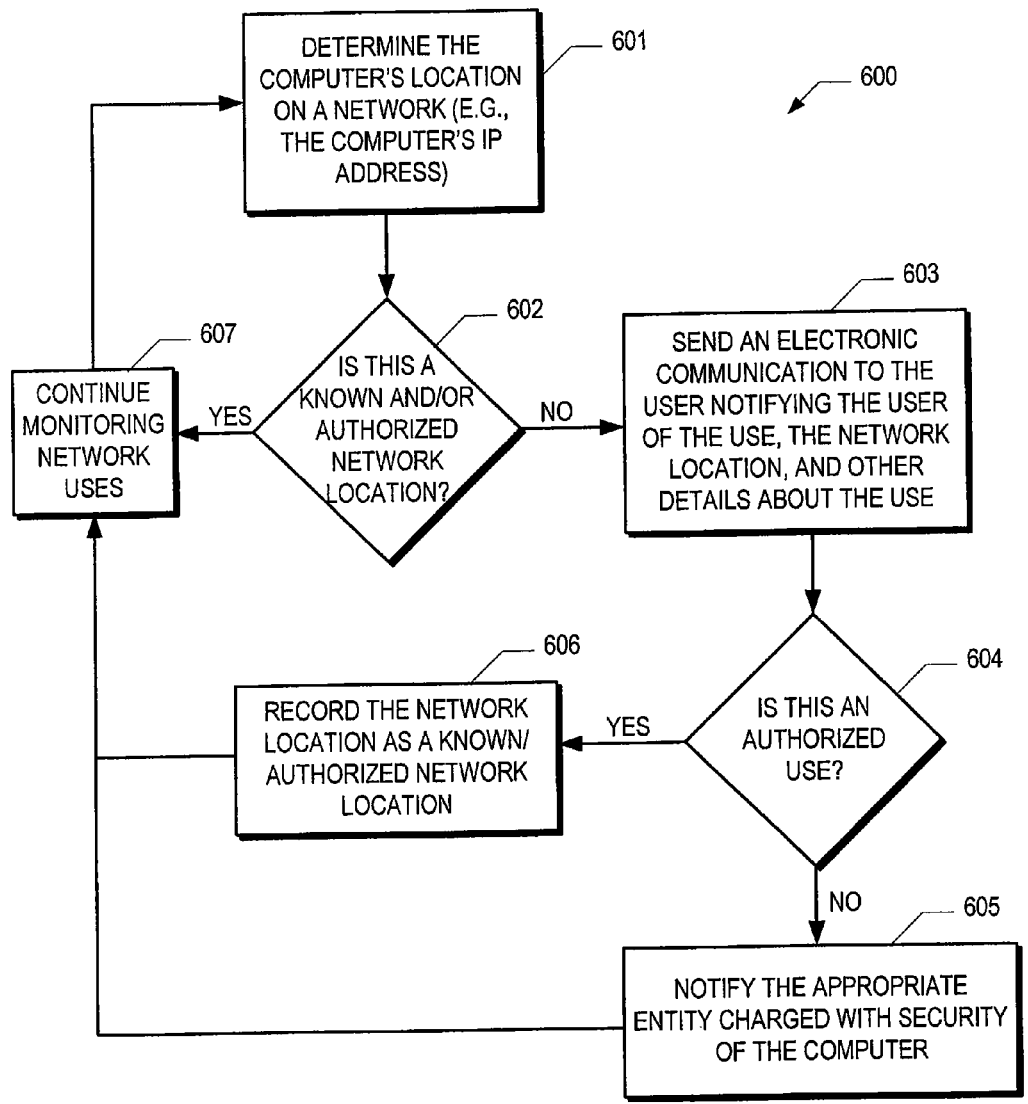
FIG. 6 is flowchart of a process for identifying unauthorized use of the secure transaction computer and tracking the secure transaction computer according to an example embodiment of the present invention.

As represented by block 601 in FIG. 6, whenever the secure transaction computer 100 accesses the Internet or other network, the internet locator phone home tool determines the location of the secure transaction computer 100 on the network. For example, the tool may identify the IP address and/or the geographic location where the secure transaction computer 100 is located. As represented by block 602, the tool then determines whether the location is a known or authorized location. For example, in one embodiment, the secure transaction computer 100 maintains, in its memory, a list of locations that correspond to prior authorized uses of the computer 100 by the user. In such an embodiment, the tool compares the current location to the list of authorized locations in the computer's memory. If there is a match, then the use is considered to be an authorized use and, as represented by block 607, the tool does nothing and continues to monitor future network uses and/or changes in network location. However, if there is not a match, in one embodiment the tool sends an electronic communication, such as an email, text message, phone call, and/or the like, to the user notifying the user about the use, as represented by block 603. Such a notification may include such information as the IP address of the use, geographic location of the use, date and time of the use, websites accessed during the use, and/or other information about the use that can help the user identify whether the use is/was authorized or not. In some embodiments, the notification prompts the user to respond if the use is not authorized or provides instructions for reporting an unauthorized use. If the user responds or otherwise reports that the use is unauthorized, as illustrated by blocks 604 and 605, the tool notifies the appropriate entity charged with security of the computer 100 and/or takes other remedial actions, such as shutting down the computer 100. On the other hand, as illustrated by blocks 604 and 606, if the user responds that the use is authorized (which, in one embodiment, may include the user failing to respond after some defined period of time), then the internet locator phone home tool stores the network location in the list in the secure transaction computer's memory as a known/authorized network location.

Referring again to FIG. 1, the secure transaction computer 100 also generally includes an Internet security module 106 that is configured to provide enhanced security when the user is surfing the Internet. As illustrated in FIG. 1, in one embodiment, the Internet security module 106 includes such features as, a small and/or short-term temp file storage, technology to deter non-secure site usage, and technology to link with Google™, Yahoo™, or other search engines or Internet-based information providers to detect dangerous sites as soon as they are identified by these providers as dangerous or likely to be dangerous (since these providers may know that a site is dangerous before it is able to shut it down or remove it from its search results). In one embodiment, the Internet security module 106 determines whether a site through which the person is going to engage in a financial transaction or otherwise share personal information is a secure site and warns the user if it is not a secure site. For example, the Internet security module 106 may, in one embodiment, be configured to notify the user in the browser whether a particular site is using HTTPS (Hypertext Transfer Protocol over Secure Socket Layer), as opposed to normal HTTP, or is using other secure or unsecure protocols.

As also illustrated in FIG. 1, embodiments of the secure transfer computer 100 further include a support module 107 that provides comprehensive help and troubleshooting. In one embodiment, the help personnel and computer-based help tools are specialized in e-commerce security and the workings of the one or more security tools that come as part of the secure transaction computer 100.

FIG. 1 also illustrates how embodiments of the secure transaction computer 100 generally include some sort of indicia 105 that conveys to a user or potential purchaser of the computer 100 that the computer has been specifically designed for enhanced security during e-commerce and online banking uses. Such indicia 105 may include for example, packaging, labels, advertising, branding, and/or the like having slogans, logos (such as the name/logo of a bank or other financial institution), or terms/phrases (such as "e-commerce computer," "online banking computer," "secure transaction computer," and/or the like) suggesting that the computer 100 is configured especially for electronic transaction security. In addition to notifying a user or purchaser of the fact that the personal computer is specifically designed for this particular use in mind, the indicia 105 can also function as a security feature by deterring misappropriation of the computer since a potential misappropriater may recognize the logo on the computer and know that misappropriating the computer may not provide any benefit to the misappropriater and may, in fact, increase the likelihood of the misappropriater being apprehended.

Although not illustrated in FIG. 1, some embodiments of the secure transaction computer 100 include a security guarantee up to a particular amount of money and for a particular length of time where a company agrees to pay the user for damages, up to a particular sum of money, resulting from a security breach resulting from use of the computer 100. Furthermore, some embodiments of the computer 100 further include enhanced physical locking capabilities such as, for example, a lock and wire for locking the computer 100 to a desk or other object, a lock for locking laptop-version of the computer 100 in the closed configuration, a lock for locking access to any disk drives and/or input and output terminals, a computer carrying case having a hard outer shell and a lock, a lock and wire or handcuffs for locking the computer carrying case to a user/object, and/or other physical locking and security devices.

Figure 2:
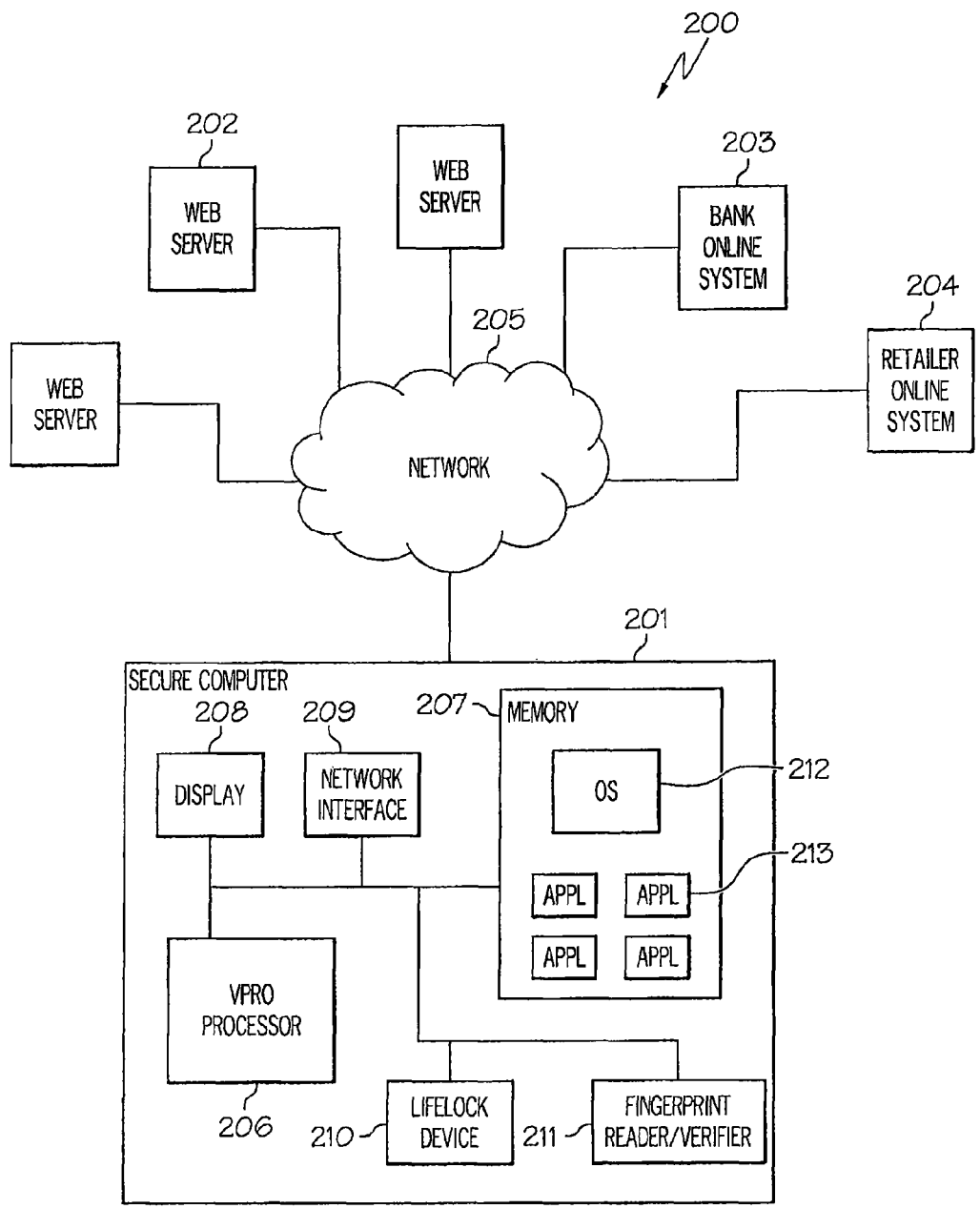
FIG. 2 is a system for secure transactions according to an example embodiment of the present invention.

Referring now to FIG. 2, FIG. 2 illustrates a system 200 for secure transactions in which an embodiment of the secure transaction computer 201 may exist, in accordance with an example embodiment of the present invention. The system 200 includes the secure computer 201 that may be interconnected via a network 205 (e.g., the Internet) to one or more different types of web servers 202, such as an online banking system 203, a retailer online system 204, third party security systems (not shown), etc. The secure computer 201 may access one or more of these web servers 202, 203, 204, and conduct e-commerce, online banking, or other secure transactions or activities. The secure computer 201 may include, for example, an Intel® vPro™ processor 206 or similar processor, a display 208, a network interface 209, a memory 207, a LifeLock device 210, and a fingerprint reader/verifier 211. The memory 207 may contain an operating system 212 and one or more different applications 213. For example, the memory 212 may contain applications that include computer-executable code for instructing the processor 206 perform the functions of the different tools and modules described above. The memory 212 may also contain data and rules used by these tools and modules, as described above. The Intel® vPro™ processor 206 may be configured to execute and run the applications through the operating system 212 or outside of the operating system 212.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer comprising indicia attached to the computer such that the indicia is visible to a user of the computer, and includes language that the computer is specifically designed and built to provide increased security for financial transactions handled over the Internet and includes a name or logo of a financial institution, wherein the computer comprises:
    a display;
    a network communication interface configured for communicating with the Internet;
    a processor operatively coupled to the network communication interface and a memory, the memory storing computer-executable program code that when executed by the processor, causes the processor to perform the steps of:
        periodically searching user-defined data stored in the memory based on a user-defined schedule,
        identifying non-public information stored in the memory by comparing the data to one or more non-public information identifying rules stored in the memory, wherein the non-public information includes one or more of a credit or debit card number, a credit or debit account number, or a social security number, and
        in response to identifying non-public information, communicating on the display (1) identification of the non-public information, (2) a memory location of the non-public information, and (3) a query comprising a request to the user whether the non-public information should be deleted from the memory, and
        receiving a user input wherein the user input comprises a request to delete the non-public information from the memory;
        in response to accessing a network, determining a network location of the computer based on the Internet Protocol (IP address);
        determining whether the network location is a known location by comparing the network location to an internally stored listing of previously accessed and authorized network locations to determine if a match exists between the network location and an entry in the listing; and
        sending an electronic communication to one of a telephone number or an electronic mail address associated with the user, if it is determined that the network location does not match an entry in the listing, the electronic communication comprises a notification to the user that the processor has accessed the network from a previously unknown network location.

2. The computer of claim 1, further comprising:
a motherboard with built-in security technology;
an operating system with built-in security features;
an identity security module;
a loss protection module;
an Internet security module; and
a support module.

3. The computer of claim 1, further comprising:
a biometric device configured for scanning a characteristic of the user's body, wherein the memory device comprises one or more files comprising biometric data for the user, and wherein the processor is configured for scanning the scan of the characteristic of the user's body with the biometric data in the one or more files and grant authorization to the user based on the comparison.

4. The computer of claim 1, further comprising:
a tracking tool configured for identifying the location of the computer if the computer is stolen;

a credit bureau protection tool configured for monitoring the user's credit report;

drive encryption technology for encrypting at least a portion of data stored in the memory and requiring a password to access the encrypted data; and a one-time password tool for requiring that a new password be used each time the computer is logged into.

5. The computer of claim 1, wherein if the user responds to the electronic communication that the computer's use is authorized or if the user does not respond to the electronic communication within a predetermined amount of time, then the computer's location is stored in the memory as a past location.

6. The computer of claim 1, wherein the electronic communication comprises an email, text message, or phone call to the user of the computer.

7. The computer of claim 1, further comprising:

computer-executable program code stored in the memory device and configured for instructing the processor to notify the user if a website that the user is surfing does not use HTTPS.

8. The computer of claim 1, further comprising:

computer-executable program code stored in the memory device and configured for instructing the processor to contact an Internet search engine to determine if a website poses a security risk.

9. The computer of claim 1, wherein the processor comprises virtualization technology.

10. The computer of claim 1, wherein the computer includes at least one virtualized software module configurable to operate outside of an operating system.

11. The computer of claim 10, wherein the computer includes a web browser, the web browser configurable to operate in a virtualized state outside of the operating system.

12. The computer of claim 11, wherein the web browser is configurable to operate in a virtualized state outside of the operating system at least one of when accessing a secure site, when accessing an e-commerce site, when accessing a secure transactions site or upon selection by the user.

13. The computer of claim 10, wherein the computer includes a monitoring application, the monitoring application detecting suspicious behavior during execution of programs on the computer, the monitoring application being configured for operating in a virtualized state outside of the operating system.

14. The computer of claim 1, further comprising the processor making duplicates of essential system files.

15. The computer of claim 14, the essential system files and the duplicates of the essential system files being monitored such that, when any of the essential system files or the duplicates of the essential system files are modified, the modified files are restored back to their original state.

* * * * *